United States Patent
Gil

(10) Patent No.: US 12,230,037 B2
(45) Date of Patent: *Feb. 18, 2025

(54) DEVICE AND METHOD FOR RECOGNIZING OBSTACLES FOR A VEHICLE

(71) Applicant: HYUNDAI MOBIS CO., LTD., Seoul (KR)

(72) Inventor: Ho Pyong Gil, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/506,158

(22) Filed: Nov. 10, 2023

(65) Prior Publication Data

US 2024/0078815 A1 Mar. 7, 2024

Related U.S. Application Data

(63) Continuation of application No. 17/535,549, filed on Nov. 24, 2021, now Pat. No. 11,847,834.

(30) Foreign Application Priority Data

Nov. 25, 2020 (KR) .................. 10-2020-0160203

(51) Int. Cl.
*G06V 20/58* (2022.01)
*G06T 7/62* (2017.01)
(Continued)

(52) U.S. Cl.
CPC ............ *G06V 20/58* (2022.01); *G06T 7/62* (2017.01); *G06V 10/25* (2022.01); *G06V 10/758* (2022.01); *G06V 10/82* (2022.01); *G06V 10/84* (2022.01); *G08G 1/166* (2013.01); *G06T 2207/20081* (2013.01); *G06T 2207/20084* (2013.01); *G06T 2207/30261* (2013.01)

(58) Field of Classification Search
CPC ........ G06V 20/58; G06V 10/25; G06V 10/84; G06V 10/82; G06V 10/758
See application file for complete search history.

(56) References Cited

U.S. PATENT DOCUMENTS

| 11,080,562 B1 * | 8/2021 | Saxena ................ G06V 10/451 |
| 2019/0130188 A1 * | 5/2019 | Zhou ..................... G06T 7/248 |
| 2019/0258878 A1 * | 8/2019 | Koivisto ................ G01S 7/417 |

FOREIGN PATENT DOCUMENTS

KR 10-2020-0049451 5/2020

OTHER PUBLICATIONS

Gil et al, "A Proposed Multi-Task Object Detector to Improve AP and Estimate Uncertainty", KSAE 2020 Annual Spring Conference, Jul. 1-4, 2020, 14 pages.

* cited by examiner

*Primary Examiner* — Rowina J Cattungal
(74) *Attorney, Agent, or Firm* — DLA Piper LLP US

(57) ABSTRACT

A device for recognizing an obstacle of a vehicle includes a camera for acquiring an image, a detection device for extracting an object by applying a convolutional neural network to the image, a center calculation device for estimating a center point and a region outside the center point of the extracted object, an uncertainty determination device for determining whether the estimated center point and region outside the center point are uncertain, and a condition determination device for determining whether travel is possible based on the determined uncertainty.

16 Claims, 25 Drawing Sheets

(51) Int. Cl.
*G06V 10/25* (2022.01)
*G06V 10/75* (2022.01)
*G06V 10/82* (2022.01)
*G06V 10/84* (2022.01)
*G08G 1/16* (2006.01)

DEVICE AND METHOD FOR RECOGNIZING OBSTACLES FOR A VEHICLE

CROSS-REFERENCE TO RELATED APPLICATION

This application is a continuation of U.S. application Ser. No. 17/535,549, filed Nov. 24, 2021, which claims the benefit of priority to Korean Patent Application No. 10-2020-0160203, filed in the Korean Intellectual Property Office on Nov. 25, 2020. The entire contents of which are incorporated herein by reference.

TECHNICAL FIELD

The present disclosure relates to a device and a method for recognizing an obstacle of a vehicle, and more particularly, to a device and a method for recognizing an obstacle of a vehicle that may prevent abnormal control in a bad travel condition by recognizing and determining the bad travel condition.

BACKGROUND

Image recognition in autonomous driving is to recognize various objects such as a vehicle, a pedestrian, a traffic light, a line, a crosswalk, and the like, and targets various attributes such as a relative position, a speed, and a size of each object.

Although there are more difficulties compared to another recognition region because of diversity of objects and attributes, when there is sufficient diversity and retention of training data, autonomous driving image recognition may also be solved with a deep learning technology.

In one example, the prior art using the deep learning requires separate training data for bad condition determination. In addition, there was a risk of causing an accident with incorrect control when recognition logic is difficult to operate properly during the autonomous driving because of the bad condition such as weather, an edge case, and the like.

SUMMARY

The present disclosure has been made to solve the above-mentioned problems occurring in the prior art while advantages achieved by the prior art are maintained intact.

An aspect of the present disclosure provides a device and a method for recognizing an obstacle of a vehicle that may prevent abnormal control resulted from an error in a bad travel condition and the like by recognizing and determining the bad travel condition using uncertainty of an extraction result of a deep learning object recognizer.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a device for recognizing an obstacle of a vehicle include a camera for acquiring an image, a detection device for extracting an object by applying a convolutional neural network to the image, a center calculation device for estimating a center point and a region outside the center point of the extracted object, an uncertainty determination device for determining whether the estimated center point and region outside the center point are uncertain, and a condition determination device for determining whether travel is possible based on the determined uncertainty.

In one implementation, the detection device may form a bounding box surrounding the object.

In one implementation, the center calculation device may form an ellipse having a predetermined range of each side of the bounding box as a diameter inside the bounding box and estimate the ellipse as a center point of the bounding box.

In one implementation, the center calculation device may estimate a remaining region except for the center point as the region outside the center point, and form a neutral region not belonging to the center point or the region outside the center point between the center point and the region outside the center point.

In one implementation, the uncertainty determination device may calculate an uncertainty value to be higher as a probability of being estimated as the center point is lower or as a probability of being estimated as the region outside the center point is lower.

In one implementation, the uncertainty determination device may calculate the uncertainty value through an equation $$H(X) = -\sum_{i=1}^{2} P(x_1)\log_2 P(x_i)$$

(here, H(x) is the uncertainty value, $P(x_1)$ is the probability of being estimated as the center point, $P(x_2)$ is the probability of being estimated as the region outside the center point, and $P(x_1)$ satisfies a condition of a sum of $P(x_1)$ and $P(x_2)$ being 1).

In one implementation, the condition determination device may determine whether the travel is possible based on an area having the uncertainty within a preset region of interest or a maximum magnitude of the uncertainty value.

In one implementation, in the region of interest, the condition determination device may determine whether the travel is possible as 'travel possible' when the area having the uncertainty value is lower than 30% and the maximum magnitude of the uncertainty value is lower than 50%, determine whether the travel is possible as 'travel caution' when the area having the uncertainty value is higher than 30% and the peak is lower than 50% or when the area is lower than 30% and the maximum magnitude of the uncertainty value is higher than 50%, and determine whether the travel is possible as 'travel impossible' when the area having the uncertainty value is higher than 30% and the maximum magnitude of the uncertainty value is higher than 50%.

In one implementation, the condition determination device may allow a warning to be generated when whether the travel is possible is determined as the 'travel caution' or the 'travel impossible' in the region of interest.

According to another aspect of the present disclosure, a method for recognizing an obstacle of a vehicle includes acquiring an image, extracting an object by applying a convolutional neural network to the image, estimating a center point and a region outside the center point of the extracted object, determining whether the estimated center point and region outside the center point are uncertain, and determining whether travel is possible based on the determined uncertainty.

In one implementation, the extracting of the object by applying the convolutional neural network to the image may include forming a bounding box surrounding the object.

In one implementation, the estimating of the center point and the region outside the center point of the extracted object may include forming an ellipse having a predetermined range of each side of the bounding box as a diameter inside the bounding box and estimating the ellipse as a center point of the bounding box.

In one implementation, the estimating of the center point and the region outside the center point of the extracted object may include estimating a remaining region except for the center point as the region outside the center point, and forming a neutral region not belonging to the center point or the region outside the center point between the center point and the region outside the center point.

In one implementation, the determining of whether the estimated center point and region outside the center point are uncertain may include calculating an uncertainty value to be higher as a probability of being estimated as the center point is lower or as a probability of being estimated as the region outside the center point is lower.

In one implementation, the determining of whether the estimated center point and region outside the center point are uncertain may include calculating the uncertainty value through an equation $$H(X) = -\sum_{i=1}^{2} P(x_1) \log_2 P(x_i)$$

(here, H(x) is the uncertainty value, $P(x_1)$ is the probability of being estimated as the center point, $P(x_2)$ is the probability of being estimated as the region outside the center point, and $P(x_1)$ satisfies a condition of a sum of $P(x_1)$ and $P(x_2)$ being 1).

In one implementation, the determining of whether the travel is possible based on the determined uncertainty may include determining whether the travel is possible based on an area having the uncertainty within a preset region of interest or a maximum magnitude of the uncertainty value.

In one implementation, the determining of whether the travel is possible based on the determined uncertainty may include, in the region of interest, determining whether the travel is possible as 'travel possible' when the area having the uncertainty value is lower than 30% and the maximum magnitude of the uncertainty value is lower than 50%, determining whether the travel is possible as 'travel caution' when the area having the uncertainty value is higher than 30% and the peak is lower than 50% or when the area is lower than 30% and the maximum magnitude of the uncertainty value is higher than 50%, and determining whether the travel is possible as 'travel impossible' when the area having the uncertainty value is higher than 30% and the maximum magnitude of the uncertainty value is higher than 50%.

In one implementation, the determining of whether the travel is possible based on the determined uncertainty may include allowing a warning to be generated when whether the travel is possible is determined as the 'travel caution' or the 'travel impossible' in the region of interest.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
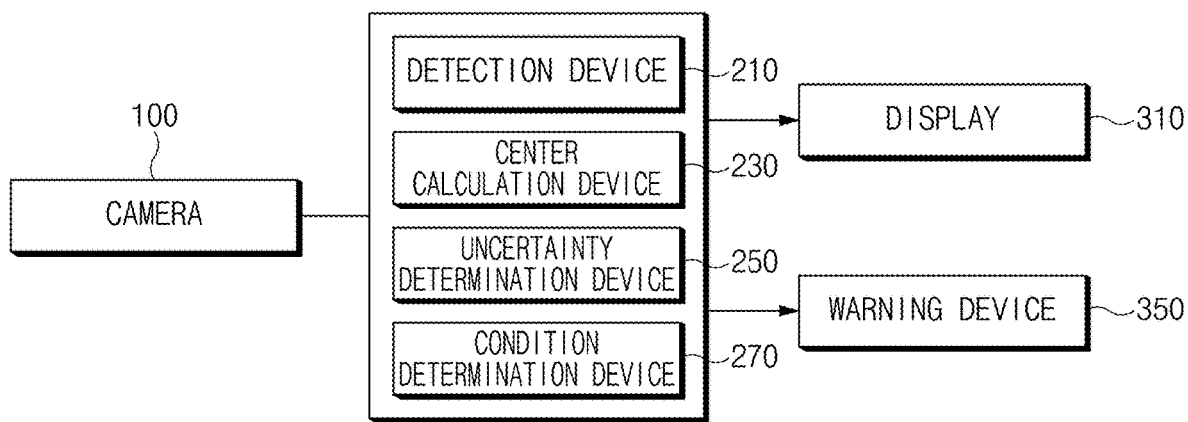
FIG. 1 is a block diagram showing an obstacle recognition device of a vehicle according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in detail with reference to FIGS. 1 to 12.

Figure 2A:
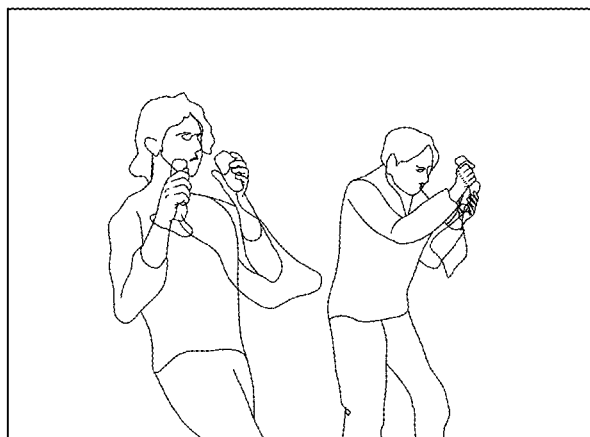
FIGS. 2A-2D are diagrams for illustrating calculation of a center point through an obstacle recognition device of a vehicle according to an embodiment of the present disclosure.
Figure 2B:
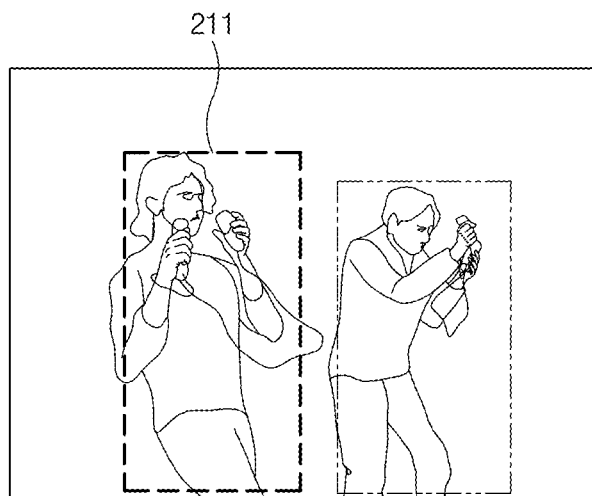
Figure 3:
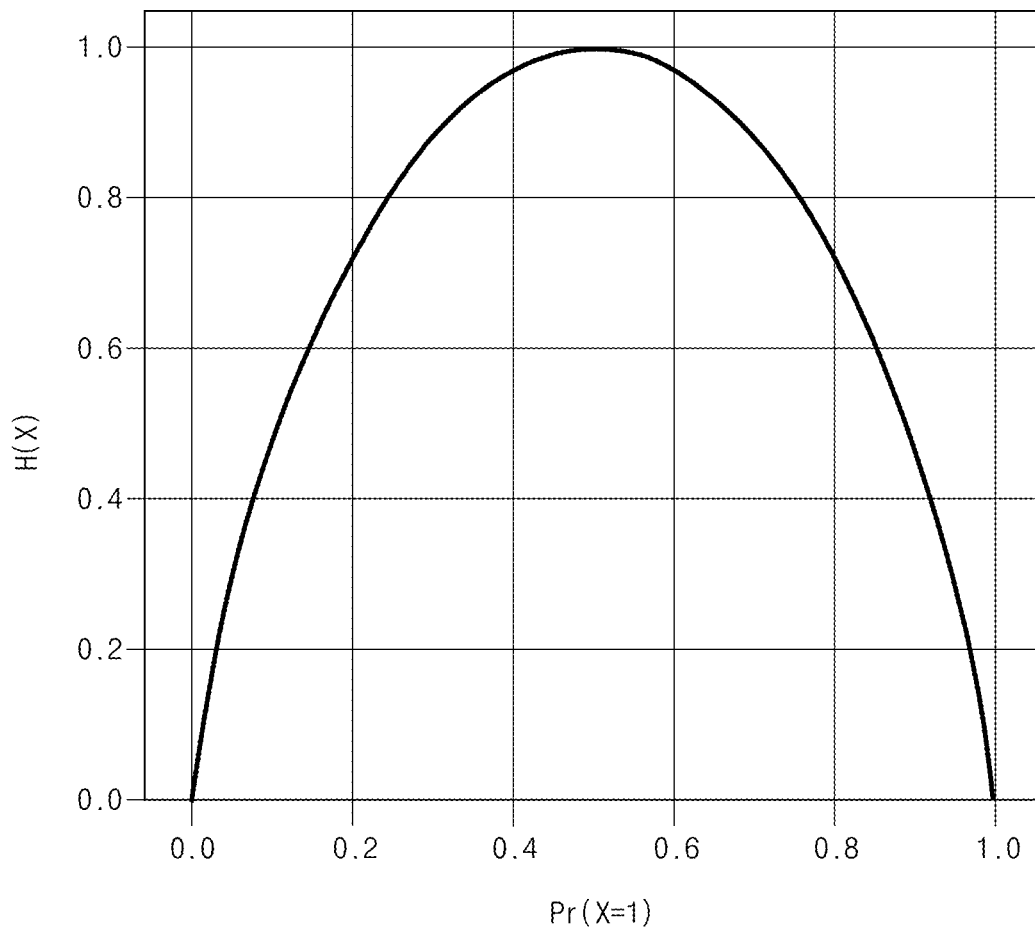
FIG. 3 is a graph for illustrating uncertainty through an obstacle recognition device of a vehicle according to an embodiment of the present disclosure.

FIG. 1 is a block diagram showing an obstacle recognition device of a vehicle according to an embodiment of the present disclosure, FIGS. 2A and 2B are diagrams for illustrating calculation of a center point through an obstacle recognition device of a vehicle according to an embodiment of the present disclosure, FIG. 3 is a graph for illustrating uncertainty through an obstacle recognition device of a vehicle according to an embodiment of the present disclosure, FIGS. 4A, 4B, 5A and 5B are diagrams showing a bounding box and uncertainty estimation in a travel image through an obstacle recognition device of a vehicle according to an embodiment of the present disclosure, FIGS. 6A, 6B, 7A and 7B are diagrams for illustrating uncertainty estimation and bad condition determination in a travel image through an obstacle recognition device of a vehicle according to an embodiment of the present disclosure, and FIGS. 8A to 12B are diagrams showing an example of uncertainty estimation of a travel image through an obstacle recognition device of a vehicle according to an embodiment of the present disclosure.

Referring to FIG. 1, an obstacle recognition device of a vehicle according to an embodiment of the present disclosure, which may determine whether an autonomous vehicle is able to travel by utilizing uncertainty in a detection result of an object recognizer based on deep learning, may be composed of a camera 100, a detection device 210, a center calculation device 230, an uncertainty determination device 250, and a condition determination device 270.

The camera 100 may film a region in front of the vehicle and input the filmed image to the detection device 210.

Not only information about a road on which the vehicle is traveling, a surrounding vehicle, and the like, but also information about a surrounding environment, lighting, and weather such as surrounding terrain feature and building, a road sign, a traffic sign, brightness, day and night, a clear day, a cloudy day, fog, snow, rain, and the like may be acquired from the image acquired through the camera 100.

The detection device 210 may receive the image acquired through the camera 100 and create a bounding box for an object based on a Faster R-CNN-type convolutional neural network (CNN), and extract attribute information of each object.

The detection device 210 may include a feature extractor, an ROI extractor, a classifier, and a bounding box regressor.

The feature extractor may include a convolution layer for performing a convolution operation and a pooling layer for performing a pooling operation to extract a plurality of feature maps from the input image, and may extract the feature map from the input image by repeatedly performing the convolution operation and the pooling operation.

The feature extractor may be implemented as a feature pyramid network (FPN).

The FPN may be used to more precisely extract a region of interest (ROI) using all of the feature maps from a high-level feature map to a low-level feature map, instead of using only a final feature map among the feature maps.

In general, when several convolution operations and pooling operations are performed, a large amount of information may be lost in the feature map. When using all the feature maps of various levels in addition to the low-level feature map rather than using only the low-level feature map, a feature map with a larger amount of information may be used.

The ROI extractor may search the region of interest (ROI) including the object from the feature map.

The ROI extractor may include a region proposal network (RPN) for determining a region where the object is likely to be on the feature map.

The RPN may scan the feature map in a sliding scheme using a plurality of anchors and search the ROI, and may additionally output a probability regarding whether it is the object or not.

The classifier may determine information related to a class of each ROI.

The class may represent a specific class (e.g., a person, a chair, a vehicle, and the like) of the object in each aligned ROI, and the classifier may calculate a probability of whether the object in each aligned ROI belongs to a specific class, and determine the class of the ROI based on the calculated probability.

A bounding box regressor, which is capable of determining information related to a position of each ROI, may determine information such as a position, a size, and the like of a rectangular bounding box surrounding each ROI.

The center calculation device 230 may estimate a center point of the bounding box for the object created through the detection device 210.

Figure 2C:
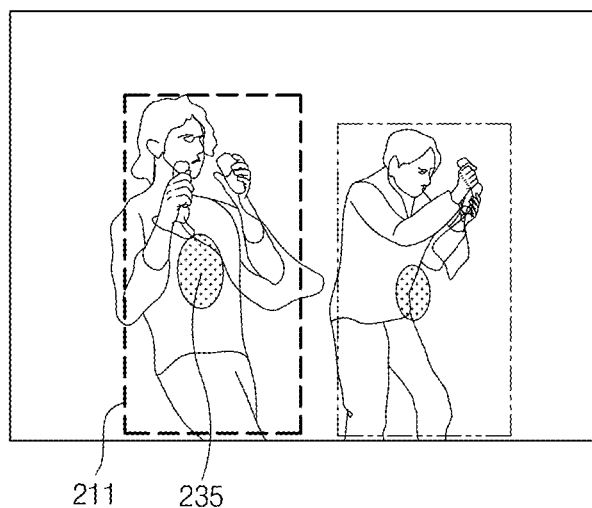

Referring to FIG. 2A, the detection device 210 may receive an image filmed through the camera 100. In an image (FIG. 2B) in which a bounding box 211 for an object is created by the detection device 210, an ellipse having a predetermined range of each side of the bounding box 211 as a diameter may be formed inside the bounding box 211 and estimated as a center point 235 of the bounding box (FIG. 2C).

Figure 2D:
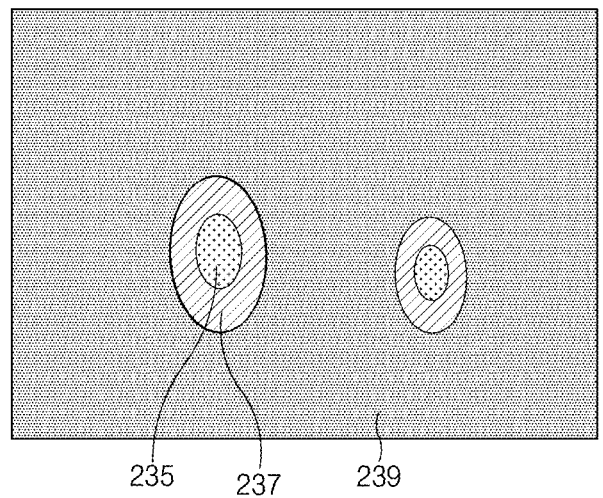

In one example, it is possible to estimate a remaining region except the center point 235 in the image filmed through the camera 100 as a region 239 outside the center point, and it is possible to form a neutral region 237 spaced apart from an outer circumferential surface of the center point 235 by a predetermined range of each side of the bounding box 211 (FIG. 2D).

That is, the neutral region 237 may be formed as an ellipse spaced apart from the outer circumferential surface of the center point 235 by the predetermined range of each side of the bounding box 211 to be a region that does not belong to the center point 235 or the region 239 outside the center point.

For example, an ellipse having a diameter of 0.2 times of each side of the bounding box 211 may be created as the center point 235, and an ellipse spaced apart from the outer circumferential surface of the center point 235 by 0.2 times of each side of the bounding box 211 may be created as the neutral region 237.

Referring to FIG. 3, when it is certain that the center point is the center point 235 as a result of estimating the center point of the bounding box for the object, 1 (100%) may be output as a probability (P) and uncertainty (H) may be 0 (0%).

Similarly, when it is certain that the region outside the center point is the region 239 outside the center point as a result of estimating the region outside the center point, 0 (100%) may be output as the probability (P) and the uncertainty (H) may be 0 (0%).

Therefore, when it is 100% certain that the center point is the center point 235 as the result of estimating the center point, or when it is 100% certain that the region outside the center point is the region 239 outside the center point, a state in which there is no uncertainty, that is, a state with the uncertainty (H) of 0% may be achieved.

However, a state in which the center point may or may not be the center point 235 may be output as the result of estimating the center point of the bounding box for the object, or a state in which the region outside the center point may be or may not be the region 239 outside the center point may be output as the result of estimating the region outside the center point.

That is, as the result of estimating the center point of the object, uncertain values of the probability of the center point 235 between 0.5 and 1 (1 to 99%) or the probability of the region 239 outside the center point between 0 and 0.5 (1 to 99%) may be output.

As the result of estimating the center point of the object, the uncertainty determination device 250 may determine uncertainty of the estimated center point and region outside the center point.

The uncertainty may be calculated through [Equation 1].

$$H(X) = -\sum_{i=1}^{2} P(x_1)\log_2 P(x_i)$$ [Equation 1]

Here, H(x) may be an uncertainty value, and $P(x_1)$ may be a probability of being estimated as the center point and may satisfy a condition in which a sum thereof with $P(x_2)$, which is a probability of being estimated as the region outside the center point, is 1.

Therefore, it may be seen that, as the probability of being estimated as the center point is lower (1→0.5) or the probability of being estimated as the region outside the center point is lower (0→0.5), the uncertainty values are calculated high (0→1). In addition, it may be seen that, when the uncertain values on whether the center point 235 and the region 239 outside the center point are respectively the center point and the region outside the center point are 0.5 (50%), respectively, the uncertainties (H) become 1 (100%), which are maximum value, respectively.

In one example, when recognition of the object is not properly achieved during autonomous driving because of the weather, an edge case, and the like, that is, when it is uncertain whether the object displayed in the image filmed through the camera 100 is actually the object or not, an accident may be caused with incorrect vehicle control.

Figure 4A:
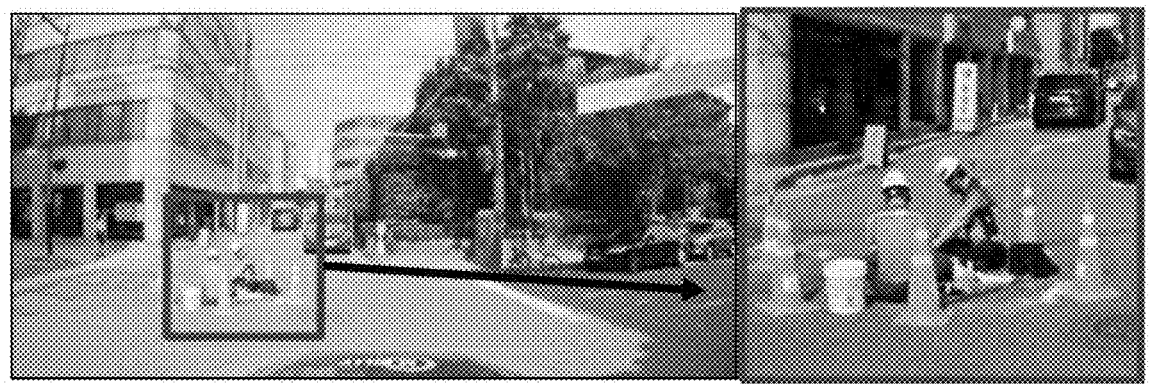
FIGS. 4A, 4B, 5A and 5B are diagrams showing a bounding box and uncertainty estimation in a travel image through an obstacle recognition device of a vehicle according to an embodiment of the present disclosure.
Figure 4B:
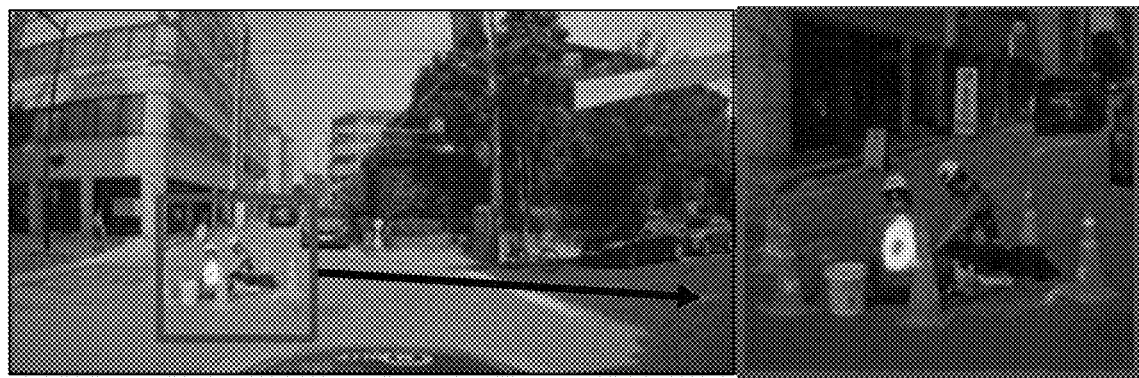
Figure 5A:
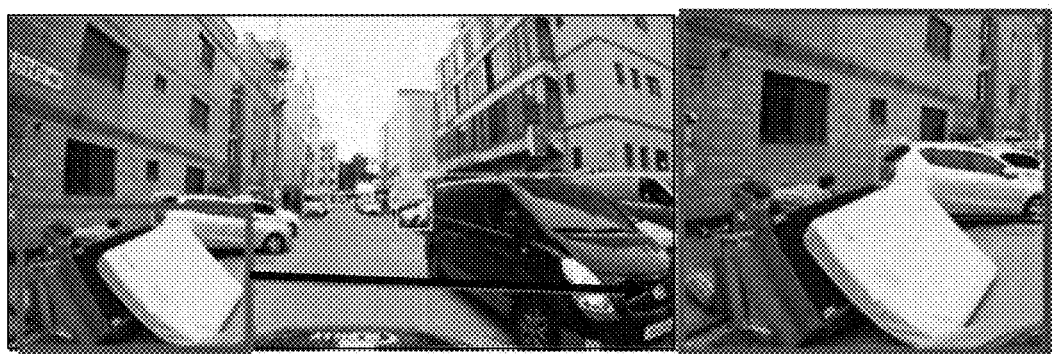
Figure 5B:
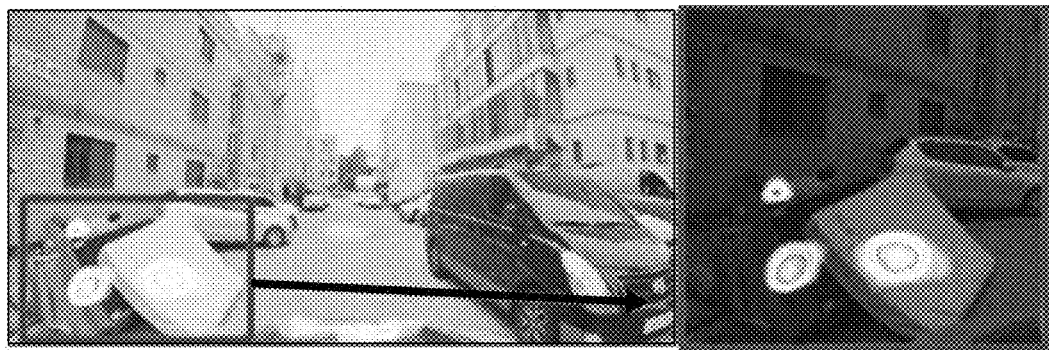

For example, as a case of uncertainty of a travel image, it may appear that there is the uncertainty when the object is not recognized as in a case of FIGS. 4A and 4B (FIG. 4A is the creation of the bounding box for the travel image, and FIG. 4B is the uncertainty estimation result) or when there is a portion to be incorrectly recognized as the object as in a case of FIGS. 5A and 5B (FIG. 5A is the creation of the bounding box for the travel image, and FIG. 5B is the uncertainty estimation result).

The condition determination device 270, which is capable of determining whether travel is possible based on the uncertainty determined through the uncertainty determination device 250, may determine whether the travel is possible based on an area having the uncertainty or a maximum magnitude of the uncertainty value in a preset region R of interest in the image filmed by the camera 100.

When the uncertainty for the object recognition in the region R of interest is visualized as an image, the condition determination device 270 may calculate areas of pixels with the uncertainty value for the object equal to or higher than 5%, and calculate a maximum value (a peak) of the included uncertainty values to determine 'travel impossible', 'travel caution', 'travel possible", or the like as whether the vehicle travel is possible by examining ranges of the area and the peak.

The condition determination device 270 may determine whether the vehicle travel is possible as the 'travel possible' as a low uncertainty state when the area is lower than 30% and the peak is lower than 50% in the region R of interest, determine whether the vehicle travel is possible as the 'travel caution' when the area is higher than 30% and the peak is lower than 50% or when the area is lower than 30% and the peak is higher than 50%, and determine whether the vehicle travel is possible as the 'travel impossible' as a high uncertainty state when the area is higher than 30% and the peak is higher than 50%.

Figure 6A:
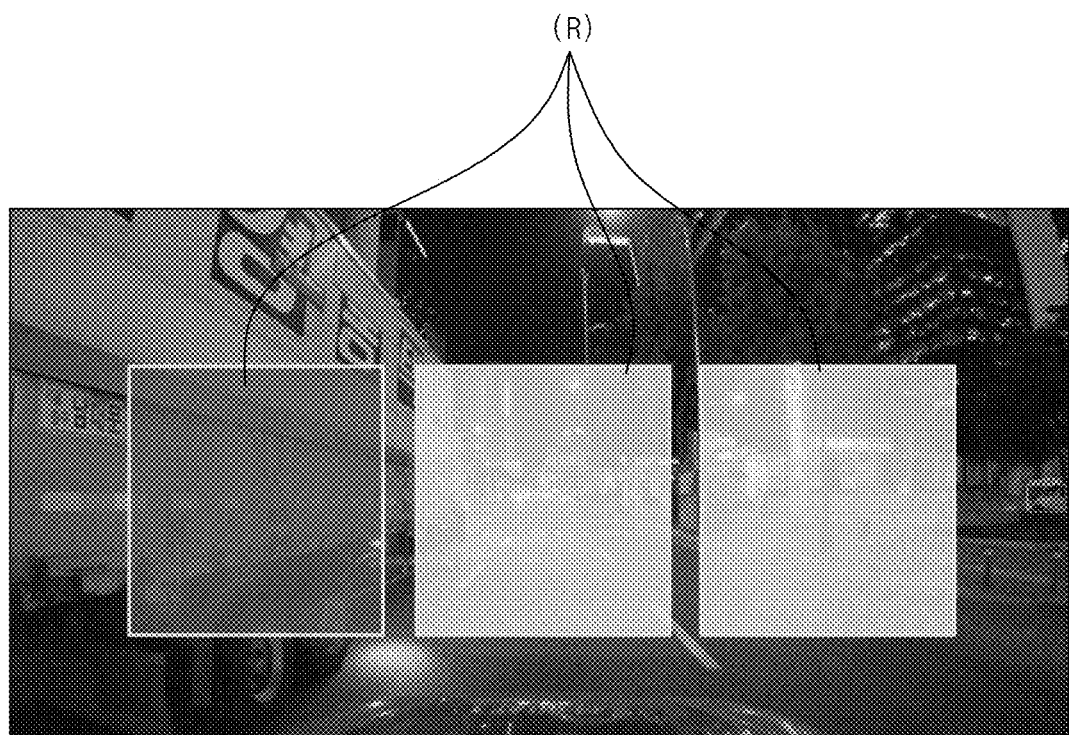
FIGS. 6A, 6B, 7A and 7B are diagrams for illustrating uncertainty estimation and bad condition determination in a travel image through an obstacle recognition device of a vehicle according to an embodiment of the present disclosure.
Figure 6B:
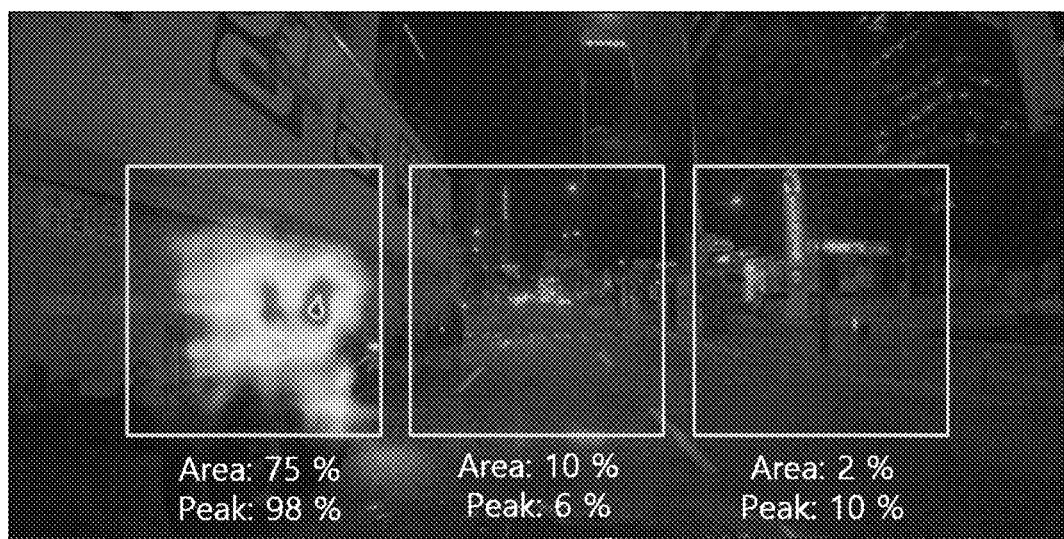

For example, referring to FIGS. 6A and 6, whether the vehicle travel is possible of a left region R of interest may be determined as the 'travel impossible' because the area is 75% and the peak is 98%, whether the vehicle travel is possible of a central region R of interest may be determined as the 'travel possible' because the area is 10% and the peak is 6%, and whether the vehicle travel is possible of a right region R of interest may be determined as the 'travel possible' because the area is 2% and the peak is 10%.

The condition determination device 270 may display a notification based on the 'travel impossible', the 'travel caution', or the 'travel possible' on a display 310 by differentiating colors of the notifications.

For example, the 'travel possible' may be displayed in green, the 'travel caution' may be displayed in yellow, or the 'travel impossible' may be displayed in red.

In particular, when it is determined that whether the vehicle travel is possible is the 'travel impossible' or the 'travel caution', as a warning notification or the like is additionally generated through a warning device 350, it is possible to allow a driver to directly control the vehicle.

Figure 7A:
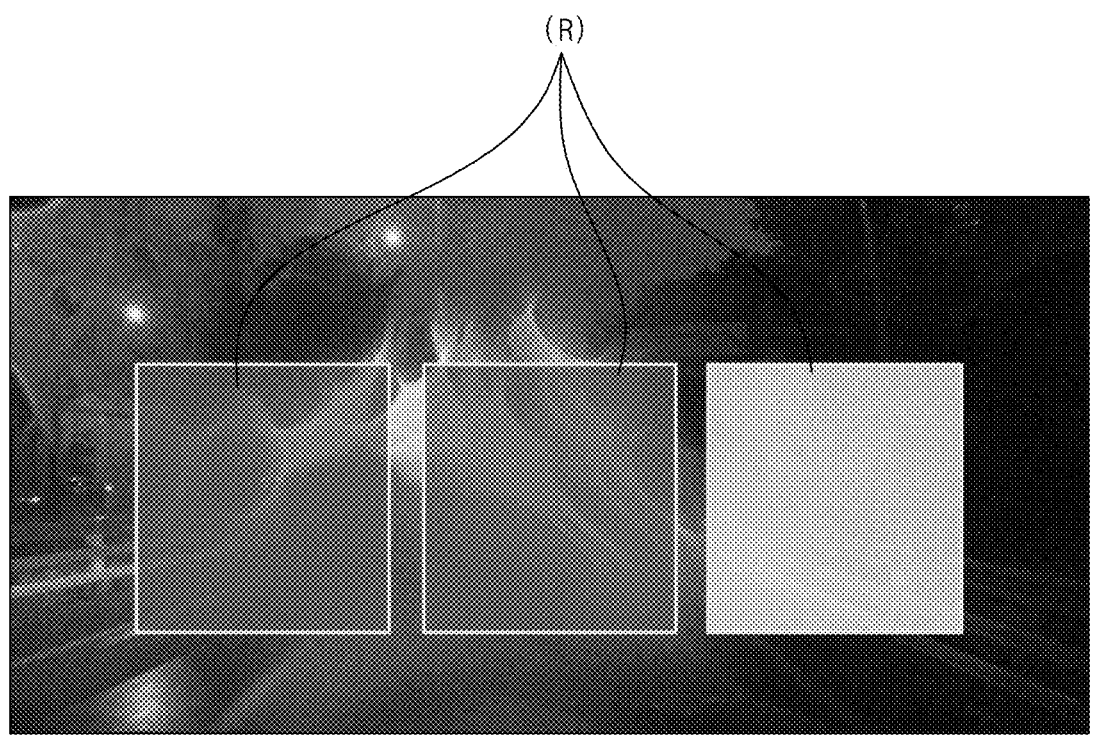
Figure 7B:
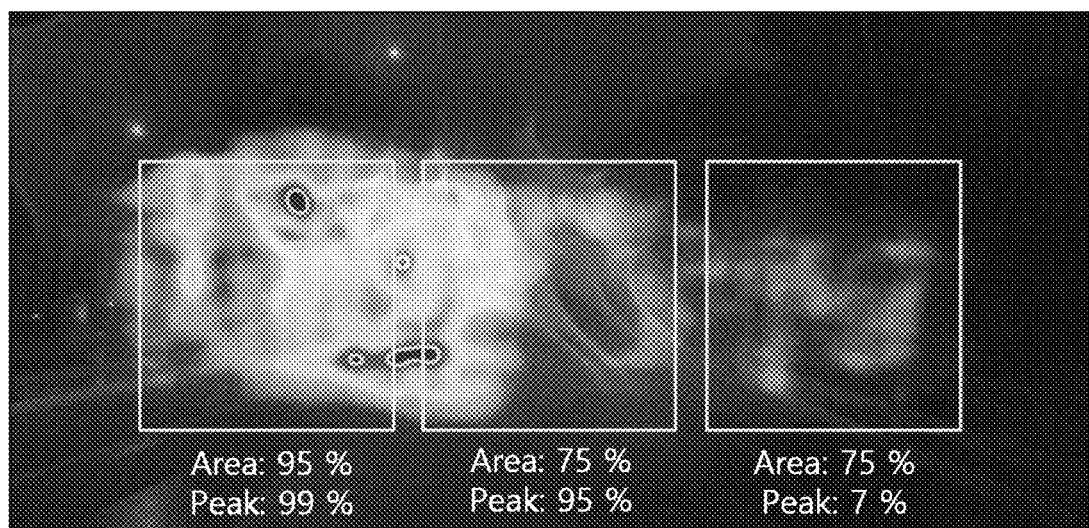

In addition, referring to FIGS. 7A and 7B, when it is determined that whether the vehicle travel is possible is the 'travel caution' or the 'travel impossible' in the left region R of interest, the central region R of interest, and the right region R of interest, that is, when it is determined that there is no space for the vehicle to travel because it is determined that the uncertainty is high in all of lines in front of, on a left side, and a right side of the vehicle, the condition determination device 270 may determine a bad condition.

When the travel condition is determined to be the bad condition, the condition determination device 270 may inform the driver of a state of the travel condition through the display 310 and the warning device 350, and allow the driver to decelerate or stop the vehicle through a driving apparatus of the vehicle, thereby preventing a risk of the accident.

Figure 8A:
FIGS. 8A to 12B are diagrams showing an example of uncertainty estimation of a travel image through an obstacle recognition device of a vehicle according to an embodiment of the present disclosure.
Figure 8B:
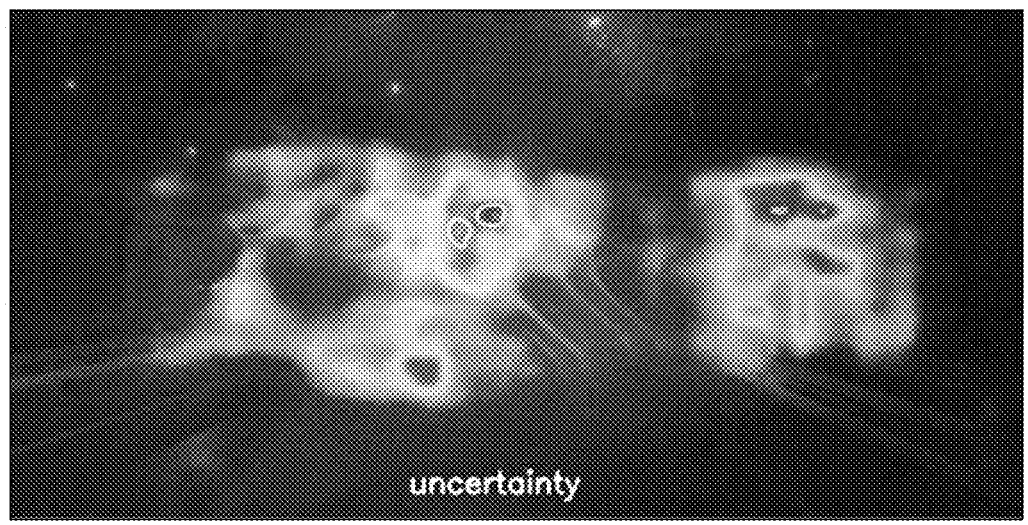
Figure 9A:
Figure 9B:
Figure 10A:
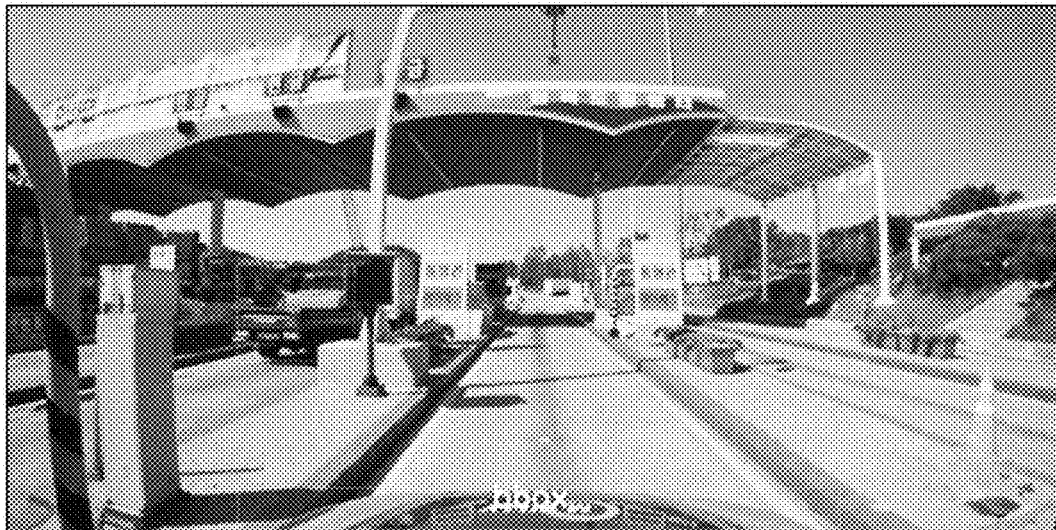
Figure 10B:
Figure 11A:
Figure 11B:
Figure 12A:
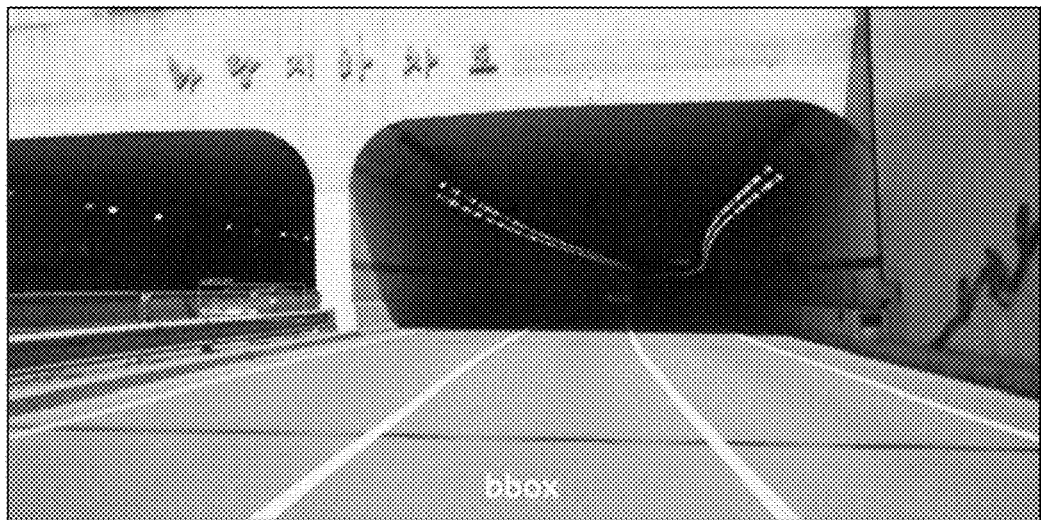
Figure 12B:
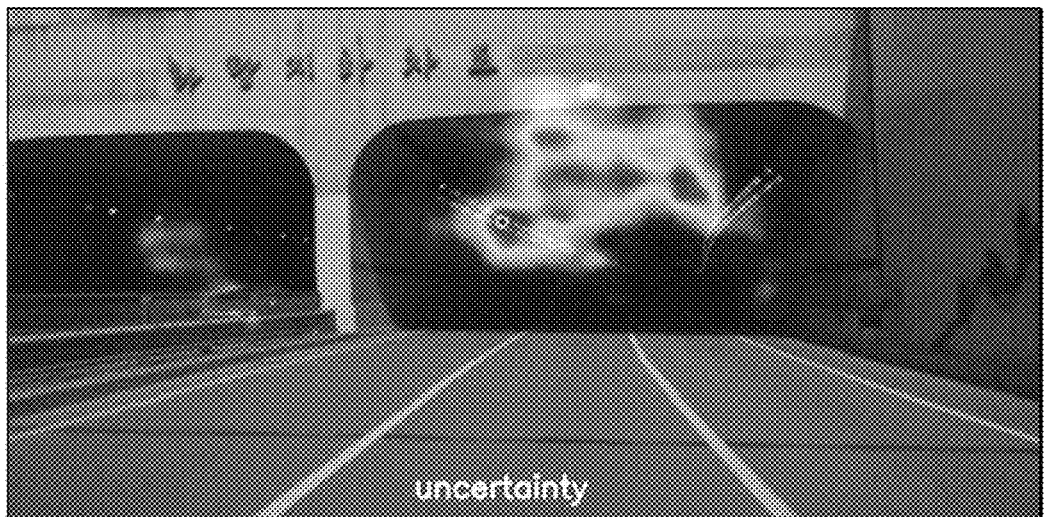

For reference, the uncertainty may appear high in images in a case of a water droplet on a camera lens on a rainy day (FIG. 8A is the bounding box for the travel image, and FIG. 8B is the uncertainty estimation result), in a case of other obstacles (FIG. 9A is the bounding box for the travel image, and FIG. 9B is the uncertainty estimation result), in a case of other structures (FIG. 10A is the bounding box for the travel image, and FIG. 10B is the uncertainty estimation result), in a case of solar backlight (FIG. 11A is the bounding box for the travel image, and FIG. 11B is the uncertainty estimation result), or in a case of when entering a tunnel (FIG. 12A is the bounding box for the travel image, and FIG. 12B is the uncertainty estimation result) among images filmed while the vehicle is traveling.

Hereinafter, a method for recognizing an obstacle of a vehicle according to another embodiment of the present disclosure will be described in detail with reference to FIG. 13.

Figure 13:
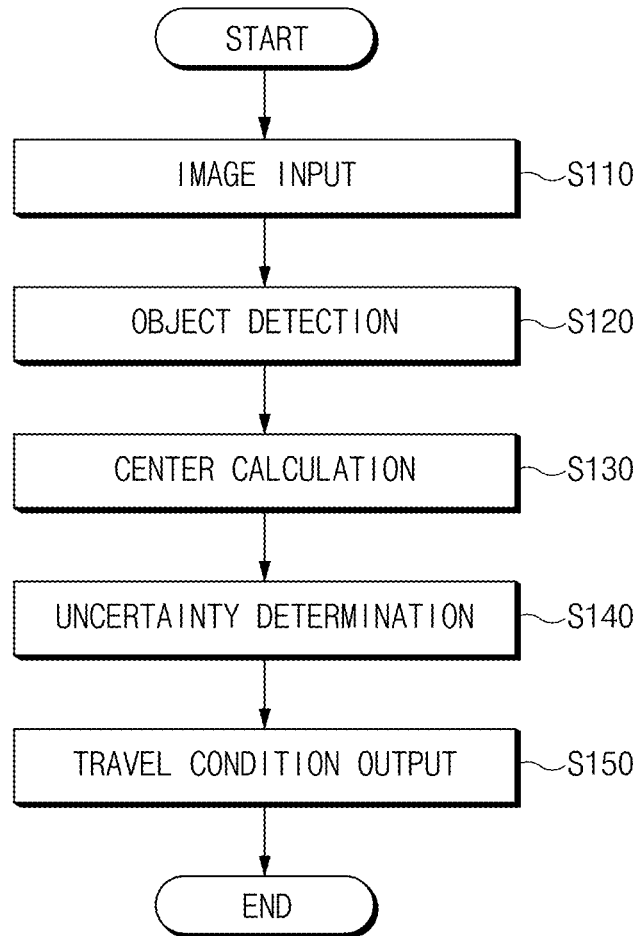
FIG. 13 is a flowchart for illustrating an obstacle recognition method of a vehicle according to an embodiment of the present disclosure.

FIG. 13 is a flowchart for illustrating an obstacle recognition method of a vehicle according to an embodiment of the present disclosure.

Hereinafter, it is assumed that the obstacle recognition device of the vehicle in FIG. 1 performs a process in FIG. 13.

First, the image may be acquired through the camera 100 (S110), and then the object may be extracted by applying the convolutional neural network (CNN) to the acquired image, and the bounding box surrounding the object may be formed (S120).

Subsequently, the center point and the region outside the center point of the extracted object may be estimated. The neutral region that does not belong to the center point or the region outside the center point may be formed (S130).

Subsequently, whether the estimated center point and region outside the center point are uncertain may be determined, and the uncertainty value may be calculated high as the probability of being estimated as the center point is lower or the probability of being estimated as the region outside the center point is lower (S140).

Subsequently, whether the travel is possible may be determined based on the determined uncertainty. Whether the travel is possible may be determined based on the area having the uncertainty within the preset region of interest or the maximum magnitude of the uncertainty value (S150).

Subsequently, when whether the travel is possible is determined as the 'travel caution' or the 'travel impossible' in the region of interest, the warning may be generated accordingly.

According to the present disclosure as described above, the deep learning object recognizer may recognize risk factors in the bad travel condition by recognizing and determining the bad travel condition using the uncertainty of the travel situation by itself.

In addition, without directly defining the separate bad condition, by utilizing only the extraction result of the deep learning object recognizer, simple and efficient development is possible, thereby reducing a cost.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

The present technology may prevent the abnormal control resulted from the error in the bad travel condition and the like by recognizing and determining the bad travel condition using the uncertainty of the extraction result of the deep learning object recognizer.

In addition, various effects that are directly or indirectly identified through this document may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for recognizing an obstacle for a vehicle, the device comprising:
   a camera for acquiring an image;
   a detection device for extracting an object from the image by applying a convolutional neural network to the image and forming a bounding box surrounding the object;
   a center calculation device for estimating a center point of the bounding box and a region outside the center point;
   an uncertainty determination device for:
   determining a first probability that the estimated center point of the bounding box is a center point of the extracted object;
   determining a second probability for the estimated region outside the center point; and
   determining, based on the first and second probabilities, an uncertainty value for each of the estimated center point of the bounding box and the region outside the center point; and
   a condition determination device for visualizing the determined uncertainty value and determining a travel recommendation based on visualization of the determined uncertainty value.

2. The device of claim 1, wherein the center calculation device forms an ellipse having a predetermined range of each side of the bounding box as a diameter inside the bounding box.

3. The device of claim 2, wherein the center calculation device estimates a remaining region except for the center point of the bounding box as the region outside the center point of the bounding box, and forms a neutral region not belonging to the center point of the bounding box or the region outside the center point between the center point of the bounding box and the region outside the center point of the bounding box.

4. The device of claim 1, wherein the uncertainty value is inversely proportional to the first and second probabilities.

5. The device of claim 4, wherein the uncertainty determination device calculates value the uncertainty through an equation $$H(X) = -\sum_{i=1}^{2} P(x_1)\log_2 P(x_i),$$

where H(x) is the uncertainty value, $P(x_1)$ is the first probability, and $P(x_2)$ is the second probability.

6. The device of claim 5, wherein the condition determination device determines the travel recommendation based on an area having the uncertainty value within a preset region of interest or a maximum magnitude of the uncertainty value.

7. The device of claim 6, wherein, in the region of interest, the condition determination device determines that the travel recommendation is possible when the area having the uncertainty value is lower than 30% and the maximum magnitude of the uncertainty value is lower than 50%, determines that the travel recommendation is caution when the area having the uncertainty value is higher than 30% and a peak is lower than 50% or when the area is lower than 30% and the maximum magnitude of the uncertainty value is higher than 50%, and determines that the travel recommendation is impossible when the area having the uncertainty value is higher than 30% and the maximum magnitude of the uncertainty value is higher than 50%.

8. The device of claim 7, wherein the condition determination device allows a warning to be generated when the travel recommendation is caution or impossible in the region of interest.

9. A method for recognizing an obstacle of a vehicle, the method comprising:
   acquiring an image;
   extracting an object by applying a convolutional neural network to the image and forming a bounding box surrounding the object;
   estimating a center point of the bounding box and a region outside the center point;
   determining a first probability that the estimated center point of the bounding box is a center point of the extracted object;

determining a second probability for the estimated region outside the center point;

determining, based on the first and second probabilities, an uncertainty value for each of the estimated center point and the region outside the center point;

visualizing the determined uncertainty value; and determining a travel recommendation based on visualization of the determined uncertainty value.

10. The method of claim 9, wherein the estimating a center point of the bounding box and a region outside the center point comprises:

forming an ellipse having a predetermined range of each side of the bounding box as a diameter inside the bounding box.

11. The method of claim 10, wherein the estimating of the center point and the region outside the center point of the extracted object includes:

estimating a remaining region except for the center point of the bounding box as the region outside the center point of the bounding box, and forming a neutral region not belonging to the center point of the bounding box or the region outside the center point between the center point of the bounding box and the region outside the center point of the bounding box.

12. The method of claim 9, wherein the uncertainty value is inversely proportional to the first and second probabilities.

13. The method of claim 12, wherein the determining of whether the estimated center point and region outside the center point are uncertain includes:

calculating the uncertainty value through an equation $$H(X) = -\sum_{i=1}^{2} P(x_1) \log_2 P(x_i),$$

where $H(x)$ is the uncertainty value, $P(x_1)$ is the first probability, and $P(x_2)$ is the second probability.

14. The method of claim 13, wherein the determining of the travel recommendation based on the visualization of the determined uncertainty value comprises:

determining the travel recommendation based on an area having the uncertainty value within a preset region of interest or a maximum magnitude of the uncertainty value.

15. The method of claim 14, wherein the determining that the travel recommendation is possible based on the visualization of the determined uncertainty value comprises:

in the region of interest, determining that the travel recommendation is possible when the area having the uncertainty value is lower than 30% and the maximum magnitude of the uncertainty value is lower than 50%;

determining that the travel recommendation is caution when the area having the uncertainty value is higher than 30% and a peak is lower than 50% or when the area is lower than 30% and the maximum magnitude of the uncertainty value is higher than 50%; and determining that the travel recommendation is impossible when the area having the uncertainty value is higher than 30% and the maximum magnitude of the uncertainty value is higher than 50%.

16. The method of claim 15, wherein the determining that the travel recommendation is possible based on the visualization of the determined uncertainty value comprises:

allowing a warning to be generated when the travel recommendation is caution or the impossible in the region of interest.

* * * * *